US012803675B2

(12) United States Patent
Minoguchi et al.

(10) Patent No.: US 12,803,675 B2
(45) Date of Patent: Nov. 17, 2026

(54) ESTIMATION METHOD, OPTICAL RECEIVING APPARATUS, AND COMPUTER PROGRAM

(71) Applicant: NTT, Inc., Tokyo (JP)

(72) Inventors: Kyo Minoguchi, Musashino (JP); Masanori Nakamura, Musashino (JP); Seiji Okamoto, Musashino (JP); Yoshiaki Kisaka, Musashino (JP)

(73) Assignee: NTT, Inc., Tokyo (JP)

( * ) Notice: Subject to any disclaimer, the term of this patent is extended or adjusted under 35 U.S.C. 154(b) by 217 days.

(21) Appl. No.: 18/717,067

(22) PCT Filed: Jan. 4, 2022

(86) PCT No.: PCT/JP2022/000006
§ 371 (c)(1),
(2) Date: Jun. 6, 2024

(87) PCT Pub. No.: WO2023/131985
PCT Pub. Date: Jul. 13, 2023

(65) Prior Publication Data
US 2025/0038860 A1 Jan. 30, 2025

(51) Int. Cl.
*H04B 10/60* (2013.01)
*H04B 10/079* (2013.01)
*H04B 10/61* (2013.01)

(52) U.S. Cl.
CPC ... *H04B 10/6165* (2013.01); *H04B 10/07955* (2013.01); *H04B 10/60* (2013.01); *H04B 10/61* (2013.01); *H04B 10/616* (2013.01)

(58) Field of Classification Search
CPC .......... H04B 10/6165; H04B 10/07955; H04B 10/616; H04B 10/61; H04B 10/60
(Continued)

(56) References Cited

U.S. PATENT DOCUMENTS 9,225,431 B1 * 12/2015 Arabaci ............ H04B 10/6161
10,422,719 B2 * 9/2019 Yamazaki ........ H04B 10/25133
(Continued)

FOREIGN PATENT DOCUMENTS

JP 2014-150365 A 8/2014
JP 2020-162095 A 10/2020

OTHER PUBLICATIONS

Seb J. Savory, "Digital filters for coherent optical receivers", vol. 16, No. 2, pp. 804-817 (2008).
(Continued)

*Primary Examiner* — Dibson J Sanchez
(74) *Attorney, Agent, or Firm* — Harness, Dickey & Pierce, P.L.C.

(57) ABSTRACT

An estimation method in an optical transmission system that performs communication by a digital coherent system including an optical transmission device and an optical reception device, the estimation method including calculating a ratio of a linearly transformed amount after converting a tap coefficient of a digital filter included in the optical reception device into a frequency domain signal by digital Fourier transform, and estimating a physical quantity related to at least a response between the optical transmission device and the optical reception device based on amplitude and phase information of the ratio of the calculated linearly transformed amount.

6 Claims, 9 Drawing Sheets

(58) Field of Classification Search
USPC .................................................. 398/202–214
See application file for complete search history.

(56) References Cited

U.S. PATENT DOCUMENTS

| | | | | |
|---|---|---|---|---|
| 11,277,207 | B1 * | 3/2022 | Ng | H04B 10/6165 |
| 2012/0057863 | A1 * | 3/2012 | Winzer | H04B 10/60 398/1 |
| 2012/0096061 | A1 * | 4/2012 | Hauske | H04B 10/6971 708/319 |
| 2014/0212132 | A1 * | 7/2014 | Saito | H04L 25/03 398/152 |
| 2015/0372764 | A1 * | 12/2015 | Kaneda | H04B 10/616 398/115 |
| 2017/0264468 | A1 * | 9/2017 | Millar | H04B 10/61 |
| 2018/0019814 | A1 * | 1/2018 | Fludger | H04B 10/40 |
| 2018/0234273 | A1 * | 8/2018 | Guo | H04B 10/532 |
| 2020/0036440 | A1 * | 1/2020 | Yamagishi | H04B 10/61 |
| 2022/0385374 | A1 * | 12/2022 | Arikawa | H04L 25/03057 |
| 2023/0130197 | A1 * | 4/2023 | Arikawa | H04J 14/06 398/208 |
| 2024/0007193 | A1 * | 1/2024 | Arikawa | H04B 10/6166 |
| 2025/0038858 | A1 * | 1/2025 | Sato | H04B 10/6162 |

OTHER PUBLICATIONS

Kazuro Kikuchi, "Fundamentals of Coherent Optical Fiber Communications", Journal of Lightwave Technology, vol. 34, No. 1, Jan. 1, 2016.
Wooseok Nam et al., "Blind Adaptive I/Q Imbalance Compensation Algorithms for Direct-Conversion Receivers", IEEE Signal Processing Letters, vol. 19, No. 8, Aug. 2012.
Edson Porto da Silva et al., "Widely Linear Blind Adaptive Equalization for Transmitter IQ-Imbalance/Skew Compensation in Multicarrier Systems", 42ndEuropean Conference and Exhibition on Optical Communications, Sep. 18-22, 2016, Dusseldorf.

* cited by examiner

EXPLANATORY NOTE $a*b$ : CONVOLUTION OPERATION OF a AND b $x^*$ : COMPLEX CONJUGATE OF x $Re(x)$ : REAL PART OF x $Im(x)$ : IMAGINARY PART OF x

SUBCARRIER SIGNAL $$u(t) = s_1(t)\exp(-j\omega_c t) + s_2(t)\exp(j\omega_c t) = Re(u(t)) + jIm(u(t))$$

$$u^*(t) = s_1^*(t)\exp(j\omega_c t) + s_2^*(t)\exp(-j\omega_c t) = Re(u(t)) - jIm(u(t))$$

$$Re(u(t)) = \frac{u(t)+u^*(t)}{2}, \quad Im(u(t)) = \frac{u(t)-u^*(t)}{2j}$$

SUBCARRIER SIGNAL AFTER IQ IMBALANCE LOADING $$\hat{u}(t) = h(k)*Re(u(t)) + g(k)*jIm(u(t)) = h(k)*\left\{\frac{u(t)+u^*(t)}{2}\right\} + g(k)*\left\{\frac{u(t)-u^*(t)}{2}\right\} = \left\{\frac{h(k)+g(k)}{2}\right\}*u(t) + \left\{\frac{h(k)-g(k)}{2}\right\}*u^*(t)$$

BASE-BAND SIGNAL AFTER DOWNCONVERSION $$r_1(t) = l(k)*[\hat{u}(t)\exp(j\omega_c t)] = \left\{\frac{h(k)\exp(j\omega_c t)+g(k)\exp(j\omega_c t)}{2}\right\}*s_1(t) + \left\{\frac{h(k)\exp(j\omega_c t)-g(k)\exp(j\omega_c t)}{2}\right\}*s_2^*(t)$$

$$r_2^*(t) = l(k)*[\hat{u}^*(t)\exp(j\omega_c t)] = \left\{\frac{h^*(k)\exp(-j\omega_c t)+g^*(k)\exp(-j\omega_c t)}{2}\right\}*s_2^*(t) + \left\{\frac{h^*(k)\exp(-j\omega_c t)-g^*(k)\exp(-j\omega_c t)}{2}\right\}*s_1(t)$$

Fig. 10

INVERSE MATRIX IN MATRIX NOTATION $$\begin{pmatrix} r_1(t) \\ r_2^*(t) \end{pmatrix} = \frac{1}{2} \begin{pmatrix} h(k)\exp(j\omega_c t)+g(k)\exp(j\omega_c t) & h(k)\exp(j\omega_c t)-g(k)\exp(j\omega_c t) \\ h^*(k)\exp(-j\omega_c t)-g^*(k)\exp(-j\omega_c t) & h^*(k)\exp(-j\omega_c t)+g^*(k)\exp(-j\omega_c t) \end{pmatrix} * \begin{pmatrix} s_1(t) \\ s_2^*(t) \end{pmatrix}$$

$$\begin{pmatrix} s_1(t) \\ s_2^*(t) \end{pmatrix} = \frac{1}{4\{(h(k)\exp(j\omega_c t)+g(k)\exp(j\omega_c t))*(h^*(k)\exp(-j\omega_c t)+g^*(k)\exp(-j\omega_c t))+(h(k)\exp(j\omega_c t)-g(k)\exp(j\omega_c t))*(h^*(k)\exp(-j\omega_c t)-g^*(k)\exp(-j\omega_c t))\}}$$

$$\cdot \begin{pmatrix} h^*(k)\exp(-j\omega_c t)+g^*(k)\exp(-j\omega_c t) & -h(k)\exp(j\omega_c t)+g(k)\exp(j\omega_c t) \\ -h^*(k)\exp(-j\omega_c t)+g^*(k)\exp(-j\omega_c t) & h(k)\exp(j\omega_c t)+g(k)\exp(j\omega_c t) \end{pmatrix} * \begin{pmatrix} r_1(t) \\ r_2^*(t) \end{pmatrix}$$

TAKING FOURIER TRANSFORM ON BOTH SIDES $$\begin{pmatrix} s_1(\omega) \\ \tilde{s}_2(\omega) \end{pmatrix} = \frac{1}{4\{(H(\omega+\omega_c)+G(\omega+\omega_c))*(H^*(-\omega-\omega_c)+G^*(-\omega-\omega_c))+(H(\omega+\omega_c)-G(\omega+\omega_c))*(H^*(-\omega-\omega_c)-G^*(-\omega-\omega_c))\}}$$

$$\cdot \begin{pmatrix} H^*(-\omega-\omega_c)+G^*(-\omega-\omega_c) & -H(\omega+\omega_c)+G(\omega+\omega_c) \\ -H^*(-\omega-\omega_c)+G^*(-\omega-\omega_c) & H(\omega+\omega_c)+G(\omega+\omega_c) \end{pmatrix} \begin{pmatrix} R_1(\omega) \\ \tilde{R}_2(\omega) \end{pmatrix}$$

Fig. 11

ESTIMATION METHOD, OPTICAL RECEIVING APPARATUS, AND COMPUTER PROGRAM

CROSS-REFERENCE TO RELATED APPLICATIONS

This application is a 371 U.S. National Phase of International Application No. PCT/JP2022/000006 filed on Jan. 4, 2022. The entire disclosure of the above application is incorporated herein by reference.

TECHNICAL FIELD

The present invention relates to an estimation method, an optical reception device, and a computer program.

BACKGROUND ART

In coherent optical communication, polarization/phase diversity transmission/reception is realized, and digital signal processing utilizing phase information obtained on a reception side is realized (See, for example, Non Patent Literature 1 and Non Patent Literature 2). Crosstalk and linear distortion between polarization multiplexed signals are equalized by adaptive coefficient control of a digital filter represented by a Finite Impulse Response (FIR) filter, and crosstalk and a delay difference between In-Phase and Quadrature of a quadrature amplitude modulation (QAM) signal can be similarly equalized by adaptive coefficient control of the FIR filter (see, for example, Non Patent Literature 3). Furthermore, crosstalk, a delay difference, and the like between subcarrier signals can be similarly equalized by coefficient control of a digital filter (see, for example, Non Patent Literature 4).

CITATION LIST

Non Patent Literature

Non Patent Literature 1: Seb J. Savory, "Digital filters for coherent optical receivers", Vol. 16, Issue 2, pp. 804-817 (2008).

Non Patent Literature 2: Kazuro Kikuchi, "Fundamentals of Coherent Optical Fiber Communications", JOURNAL OF LIGHTWAVE TECHNOLOGY, VOL. 34, NO. 1, Jan. 1, 2016.

Non Patent Literature 3: Wooseok Nam, Heejin Roh, Jungwon Lee and Inyup Kang, "Blind Adaptive I/Q Imbalance Compensation Algorithms for Direct-Conversion Receivers", IEEE SIGNAL PROCESSING LETTERS, VOL. 19, NO. 8, August 2012.

Non Patent Literature 4: Edson Porto da Silva, Darko Zibar, "Widely Linear Blind Adaptive Equalization for Transmitter IQ-Imbalance/Skew Compensation in Multicarrier Systems", 42nd European Conference and Exhibition on Optical Communications, Sep. 18-22, 2016, Dusseldorf.

SUMMARY OF INVENTION

Technical Problem

On the other hand, waveform distortion occurs due to the presence of a delay difference, an amplitude error, and an orthogonal error between the I channel and the Q channel of the QAM signal, and thus signal quality deteriorates. Although waveform distortion can be compensated by a digital filter, there is a limit to performance improvement by compensation because there is imperfection in restriction of the number of taps and coefficient control. Therefore, it is possible to directly remove the distortion by identifying the cause of the distortion and observing and measuring the physical quantity that causes the distortion. As a result, the amount of compensation by the digital filter can be reduced, and the signal quality can be improved. However, such a method has a problem in that a dedicated measuring instrument for measuring a physical quantity is separately required, resulting in inefficiency in operation.

In view of the above circumstances, an object of the present invention is to provide a technique capable of efficiently identifying a factor of signal quality deterioration without performing measurement by a dedicated device.

Solution to Problem

An aspect of the present invention is an estimation method in an optical transmission system that performs communication by a digital coherent system including an optical transmission device and an optical reception device, the estimation method including calculating a ratio of a linearly transformed amount after converting a tap coefficient of a digital filter included in the optical reception device into a frequency domain signal by digital Fourier transform, and estimating a physical quantity related to at least a response between the optical transmission device and the optical reception device based on amplitude and phase information of the ratio of the calculated linearly transformed amount.

An aspect of the present invention is an optical reception device in an optical transmission system that performs communication by a digital coherent system including an optical transmission device and the optical reception device, the optical reception device including an adaptive equalization unit that performs adaptive equalization processing using a digital filter, a Fourier transform unit that converts a tap coefficient of the digital filter into a signal in a frequency domain by digital Fourier transform, and an estimation unit that calculates a ratio of a linearly transformed amount after conversion into a signal in a frequency domain by the Fourier transform unit, and estimates a physical quantity related to at least a response between the optical transmission device and the optical reception device based on amplitude and phase information of the calculated ratio of the linearly transformed amount.

An aspect of the present invention is a computer program for causing a computer to function as an optical reception device in an optical transmission system that performs communication by a digital coherent system including an optical transmission device and the optical reception device, the computer program causing the computer to perform converting a tap coefficient of a digital filter included in the optical reception device into a signal in a frequency domain by digital Fourier transform, calculating a ratio of a linearly transformed amount after the conversion into the signal in a frequency domain, and estimating a physical quantity related to at least a response between the optical transmission device and the optical reception device based on amplitude and phase information of the calculated ratio of the linearly transformed amount.

Advantageous Effects of Invention

According to the present invention, it is possible to efficiently identify a factor of signal quality deterioration without performing measurement by a dedicated device.

BRIEF DESCRIPTION OF DRAWINGS

FIG. 10 is a diagram illustrating a relational expression for deriving a relationship of (Equation 4).

FIG. 11 is a diagram illustrating the relational expression for deriving the relationship of (Equation 4).

DESCRIPTION OF EMBODIMENTS

Hereinafter, an embodiment of the present invention will be described with reference to the drawings.

(Outline)

In the optical transmission system according to the present invention, a ratio of a linearly transformed amount after a tap coefficient of a digital filter included in an optical reception device is converted into a frequency domain signal by digital Fourier transform is calculated, and at least a physical quantity related to a response between the optical transmission device and the optical reception device is estimated from amplitude and phase information thereof. Here, the physical quantity related to the response between the optical transmission device and the optical reception device is a delay difference, an amplitude difference, and an orthogonal error between the I channel and the Q channel. As a result, a physical quantity that causes distortion can be estimated. It is possible to efficiently identify a factor of signal quality deterioration without performing measurement by a dedicated device.

Hereinafter, specific configurations for achieving the above processing will be described.

First Embodiment

In the first embodiment, a case where a single carrier signal is input to an optical reception device will be described as an example.

Figure 1:
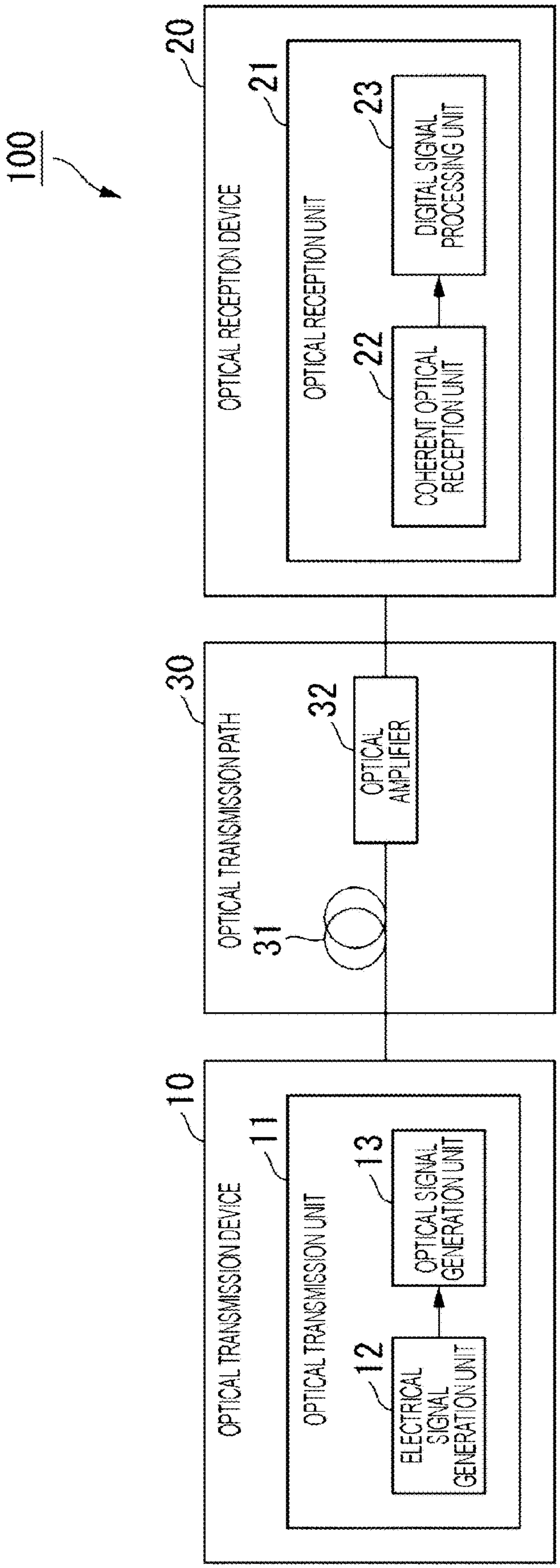
FIG. 1 is a diagram illustrating a system configuration of an optical transmission system in a first embodiment.

FIG. 1 is a diagram illustrating a system configuration of an optical transmission system 100 according to a first embodiment. The optical transmission system 100 includes an optical transmission device 10 and an optical reception device 20. The optical transmission device 10 and the optical reception device 20 are connected via an optical transmission path 30. The optical transmission path 30 transmits an optical signal transmitted by the optical transmission device 10 to the optical reception device 20. The optical transmission path 30 includes an optical fiber 31 that connects the optical transmission device 10 and the optical reception device 20 and an optical amplifier 32 that amplifies an optical signal. Note that, in the optical transmission path 30, a device such as an optical switch or a reproduction repeater may be inserted in the middle of the path.

The optical transmission device 10 includes an optical transmission unit 11 that transmits an optical signal of a single carrier. The optical transmission unit 11 includes an electrical signal generation unit 12 and an optical signal generation unit 13. The electrical signal generation unit 12 encodes transmission data that is an information source, and converts the encoded transmission data into a waveform of an electrical signal to generate and output an electrical signal of the transmission data.

The optical signal generation unit 13 converts the electrical signal generated by the electrical signal generation unit 12 into an optical signal, and transmits the optical signal to the optical reception device 20 via the optical transmission path 30. The inside of the optical signal generation unit 13 includes a digital-to-analog converter, a driver amplifier, a modulator, a laser, and the like. The optical signal generation unit 13 generates an optical signal using, for example, a quadrature phase shift keying (QPSK) modulation scheme.

The optical reception device 20 includes an optical reception unit 21 that receives an optical signal. The optical reception unit 21 includes a coherent optical reception unit 22 and a digital signal processing unit 23. Inside the coherent optical reception unit 22, a 90 degree optical hybrid circuit, a local oscillation light source, a photodetector, and optical fibers that couple them are provided. Note that the coherent optical reception unit 22 may be provided with an analog-to-digital converter, or an analog-to-digital converter may be provided between the coherent optical reception unit 22 and the digital signal processing unit 23.

The coherent optical reception unit 22 separates a baseband optical signal into two optical signals having polarization planes orthogonal to each other. These optical signals and the local oscillation light of the local oscillation light source are input to the 90 degree optical hybrid circuit, and a set of output light in which both light beams interfere with each other in the same phase and the opposite phase, and a set of output light in which both light beams interfere with each other at orthogonal (90°) and inverse orthogonal (−90°), that is, a total of four output lights are obtained. These output light beams are converted from an optical signal to an analog electrical signal by a photodiode. The analog-to-digital converter converts the analog signal into a digital signal and outputs the digital signal to the digital signal processing unit 23.

When an optical signal propagates through the optical transmission path 30, a signal waveform is distorted by a non-linear optical effect in which a phase of the signal rotates in proportion to optical power of the signal. The digital signal processing unit 23 takes in the digital signal output from the analog-to-digital converter as a reception signal and performs various kinds of compensation on the taken reception signal.

Figure 2:
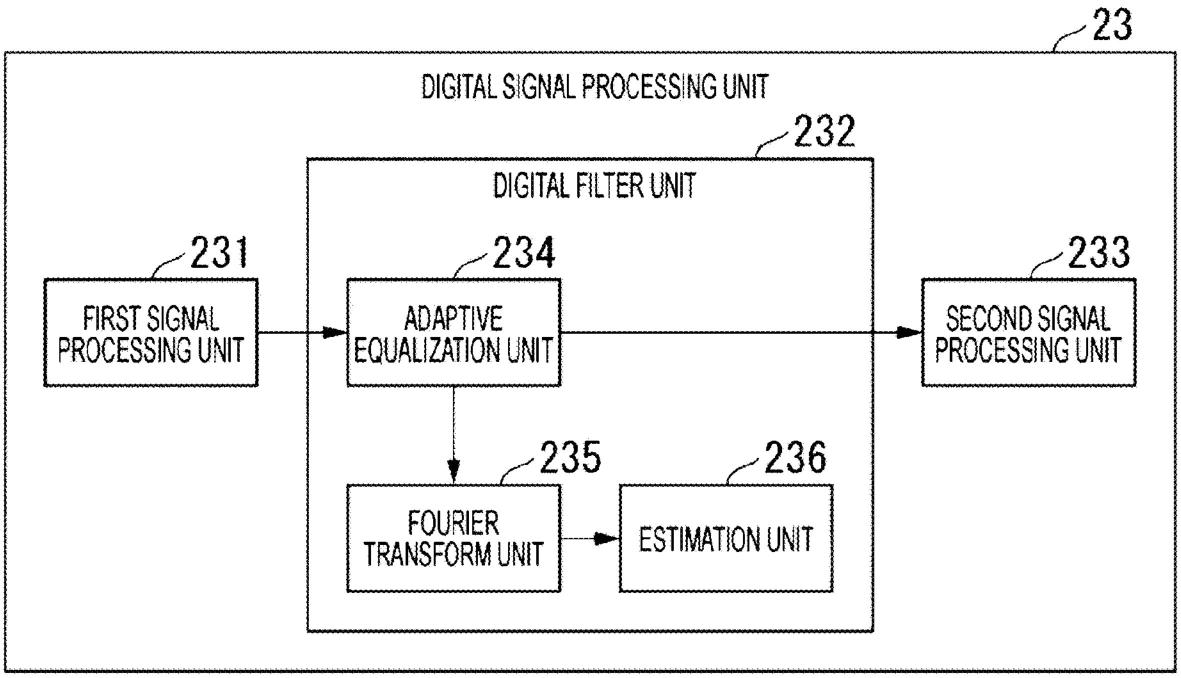
FIG. 2 is a diagram illustrating a configuration example of a digital signal processing unit in the first embodiment.

FIG. 2 is a diagram illustrating a configuration example of the digital signal processing unit 23 in the first embodiment. The digital signal processing unit 23 includes a first signal processing unit 231, a digital filter unit 232, and a second signal processing unit 233.

The first signal processing unit 231 performs signal processing on the input digital signal. For example, the first signal processing unit 231 compensates for wavelength dispersion generated in the optical transmission path 30 in the input digital signal. Note that the signal processing performed by the first signal processing unit 231 is not limited thereto, and other signal processing may be performed. For example, the first signal processing unit 231 may perform any signal processing as long as the signal processing is conventionally performed before the adaptive equalization processing is performed by an adaptive equalization unit 234 (adaptive equalizer).

The digital filter unit 232 compensates for distortion generated in the waveform of the optical signal in the optical transmission path 30. The digital filter unit 232 includes the adaptive equalization unit 234, a Fourier transform unit (Fourier transformer) 235, and an estimation unit (estimator) 236. The adaptive equalization unit 234 executes adaptive equalization processing using a digital filter such as a finite impulse response (FIR) filter according to the set tap coefficient.

The Fourier transform unit 235 converts the tap coefficient of the digital filter into a frequency domain signal by performing digital Fourier transform.

The estimation unit 236 calculates a ratio of the linearly transformed amounts based on the frequency domain signal, and estimates a physical quantity related to the response between the transceivers from the amplitude and the phase information.

The second signal processing unit 233 performs signal processing on the digital signal on which the adaptive equalization processing has been performed. The second signal processing unit 233 performs, for example, in the input digital signal, processing of compensating for a frequency offset, processing of compensating for a phase offset, and demodulation and decoding on the digital signal. Note that the signal processing performed by the second signal processing unit 233 is not limited thereto, and other signal processing may be performed. For example, the second signal processing unit 233 may perform any signal processing as long as the signal processing is conventionally performed after the adaptive equalization processing is performed by the adaptive equalization unit 234.

Figure 3:
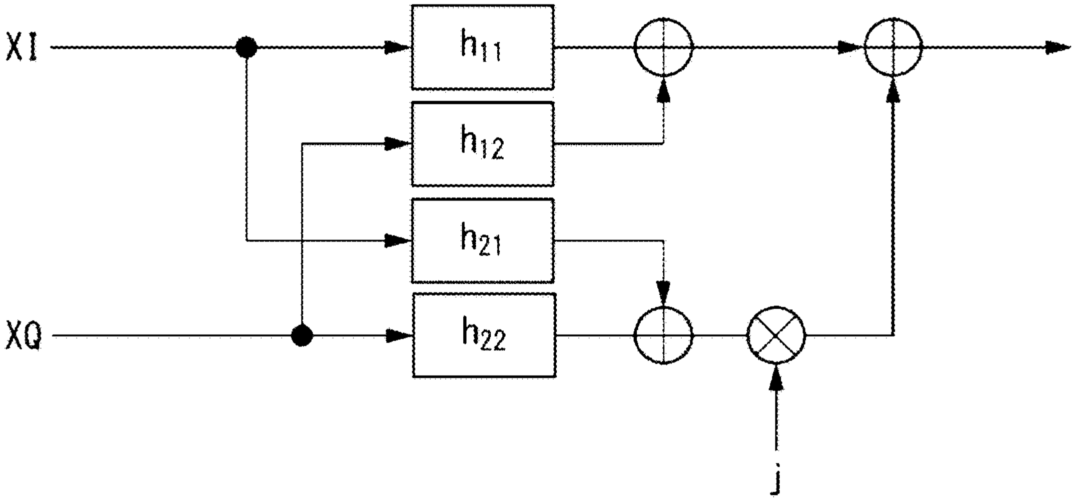
FIG. 3 is a diagram illustrating an example of a digital filter (FIR filter) included in a digital filter unit in the first embodiment.

FIG. 3 is a diagram illustrating an example of a digital filter (FIR filter) included in the digital filter unit 232 in the first embodiment. In FIG. 3, $h_{11}$ represents a tap coefficient In-Phase→In-Phase component (real vector) of the digital filter, $h_{12}$ represents a tap coefficient Quadrature→In-Phase component (real vector) of the digital filter, $h_{21}$ represents a tap coefficient In-Phase→Quadrature component (real vector) of the digital filter, and $h_{22}$ represents a tap coefficient Quadrature→Quadrature component (real vector) of the digital filter. The mathematical model of the distortion equalized by the digital filter in the first embodiment can be expressed as in FIG. 4.

Figure 4:
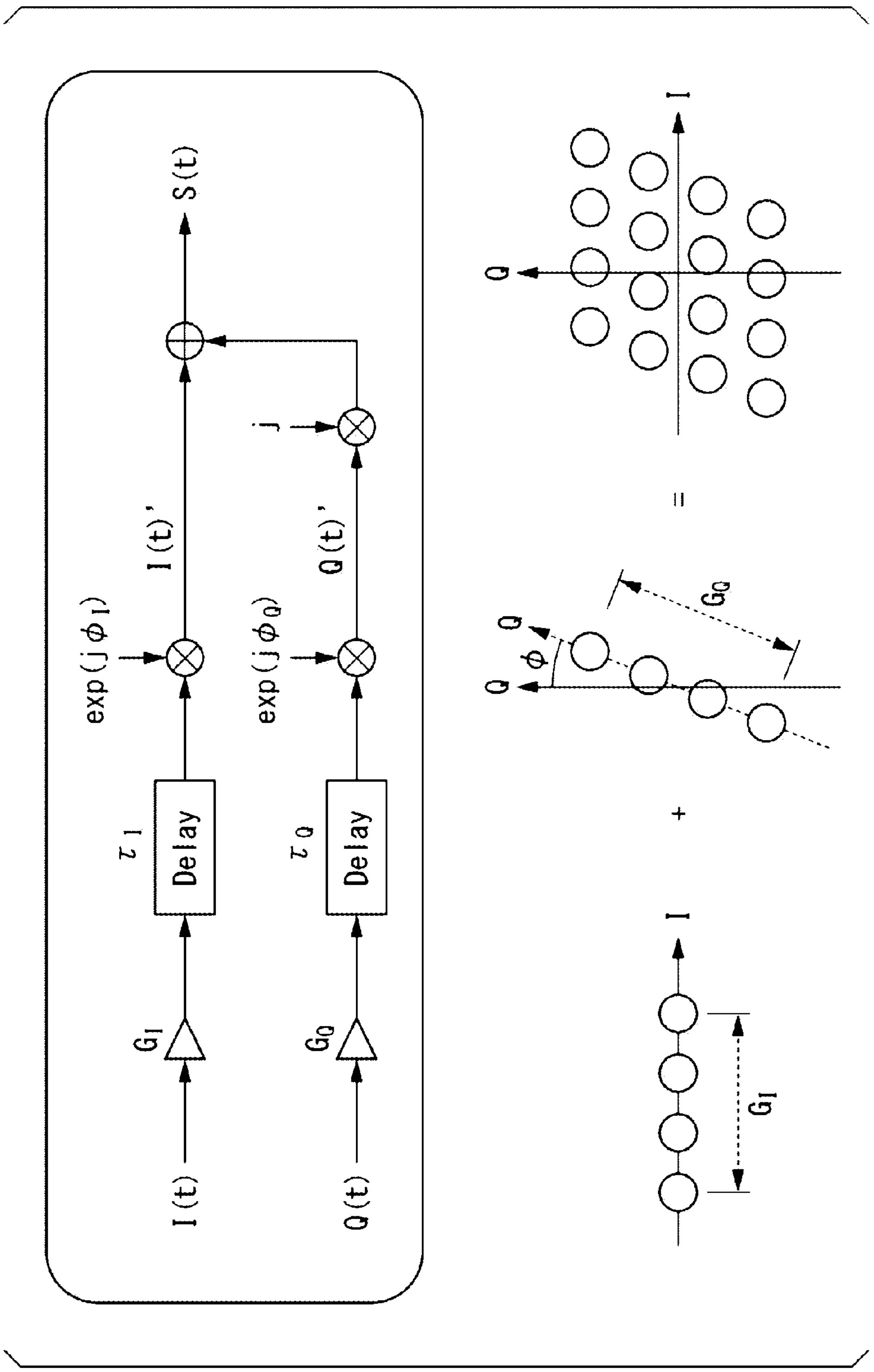
FIG. 4 is a diagram illustrating an example of a mathematical model of distortion equalized by a digital filter in the first embodiment.

FIG. 4 is a diagram illustrating an example of a mathematical model of distortion equalized by a digital filter in the first embodiment. Each reference sign illustrated in FIG. 4 represents the following content.

I (t): Time-domain representation I-phase component of the base-band signal (real scalar)

Q (t): Time domain representation Q component of the base-band signal (real scalar)

$G_I$: Gain coefficient I-phase component of the base-band signal (real scalar)

$G_Q$: Gain coefficient Q-phase component of the base-band signal (real scalar)

$\tau_I$: Time delay I-phase component of the base-band signal (real scalar)

$\tau_Q$: Time delay Q-phase component of the base-band signal (real scalar)

$\phi_I$: Phase rotation I-phase component of the base-band signal (real scalar)

$\phi_Q$: Phase rotation Q-phase component of the base-band signal (real scalar)

The output s(t) illustrated in FIG. 4 is expressed as (Equation 1) below.

[Math. 1]

$$s(t) = \underbrace{I(t-\tau_I)\cdot G_I\cdot\exp(j\cdot\varphi_I)}_{I(t)'} + j\cdot\underbrace{Q(t-\tau_Q)\cdot G_Q\cdot\exp(j\cdot\varphi_Q)}_{Q(t)'} \quad \text{(Equation 1)}$$

Figure 5:
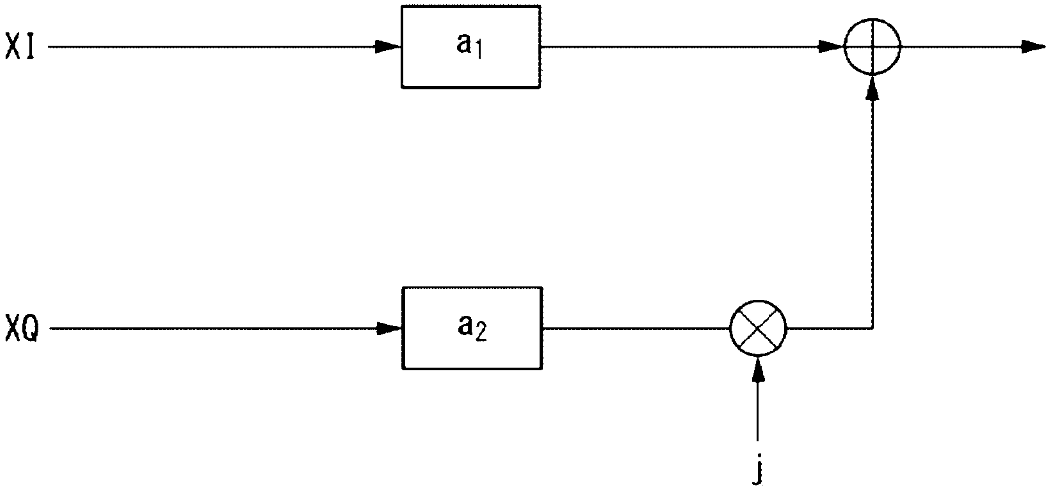
FIG. 5 is a diagram illustrating an example in which a configuration of a digital filter in the first embodiment is equivalently transformed in accordance with a mathematical model.

Here, since the configuration of the generally implemented digital filter illustrated in FIG. 3 is different from the mathematical model illustrated in FIG. 4, equivalent transformation is required as illustrated in FIG. 5. FIG. 5 is a diagram illustrating an example in which a configuration of a digital filter in the first embodiment is equivalently transformed in accordance with a mathematical model. In FIG. 5, the input signal is a real number, and the coefficient is a complex number. By performing equivalent transformation on the configuration of the digital filter in accordance with the mathematical model, tap coefficients $a_1$, $a_2$ of the digital filter are complexed by the equivalent configuration. For example, the tap coefficients $a_1$, $a_2$ of the digital filter in FIG. 5 are expressed as (Equation 2) below.

[Math. 2]

$$a_1 = h_{11} + jh_{21} \quad \text{(Equation 2)}$$
$$a_2 = h_{22} - jh_{12}$$

The Fourier transform unit 235 converts the tap coefficients $a_1$, $a_2$ of the digital filter into the signal in frequency domains of $A_1(\omega)$ and $A_2(\omega)$ by performing digital Fourier transform on the tap coefficients $a_1$, $a_2$ of the digital filter. Thereafter, the estimation unit 236 calculates a ratio $(A_2(\omega)/A_1(\omega))$ of amounts of $A_1(\omega)$ and $A_2(\omega)$ converted into the signal in frequency domains, and estimates physical quantities such as an amplitude difference, a delay difference, and an orthogonal error from amplitude and phase information of the calculated ratio. $A_1(\omega)$ represents a signal in the frequency domain in the I lane (also referred to as $A_I$), and $A_2(\omega)$ represents a signal in a frequency domain in the Q lane (also referred to as $A_Q$).

Figure 6:
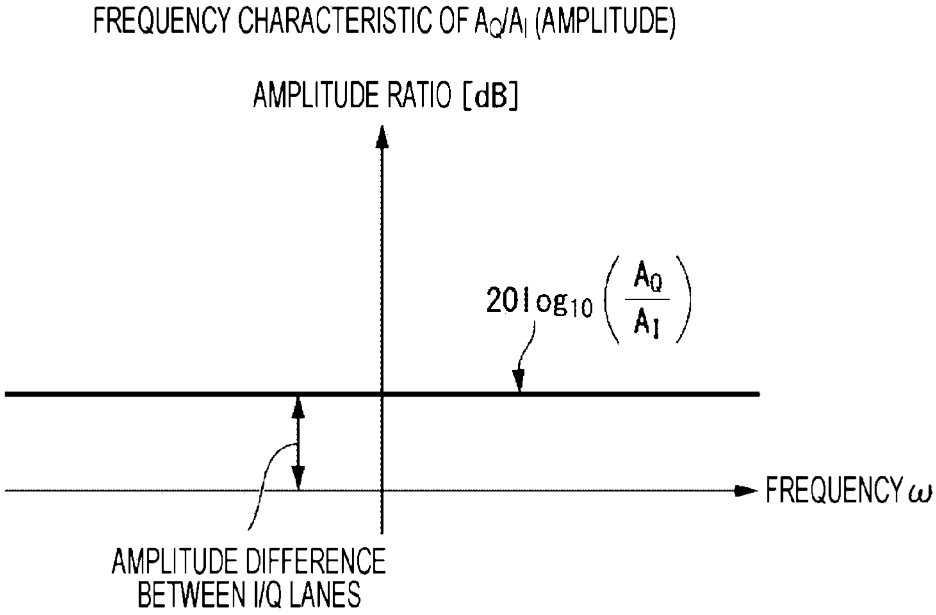
FIG. 6 is a diagram for illustrating how to obtain an amplitude difference between an I lane and a Q lane in the first embodiment.

FIG. 6 is a diagram for illustrating how to obtain an amplitude difference between the I lane and the Q lane in the first embodiment. $A_I$ and $A_Q$ in FIG. 6 are expressed as (Equation 3) below.

[Math. 3]

$$A_I = G_I \cdot \exp(j \cdot (\tau_I \cdot \omega + \varphi_I)) \quad \text{(Equation 3)}$$
$$A_Q = G_Q \cdot \exp(j \cdot (\tau_Q \cdot \omega + \varphi_Q))$$

Then, the estimation unit 236 calculates the ratio of the amounts of $A_I$ and $A_Q$ and calculates the amplitude ratio based on 20 $\log_{10}$ ($A_Q/A_1$). The estimation unit 236 estimates the calculated value of the amplitude ratio as the amplitude difference between the I lane and the Q lane.

Figure 7:
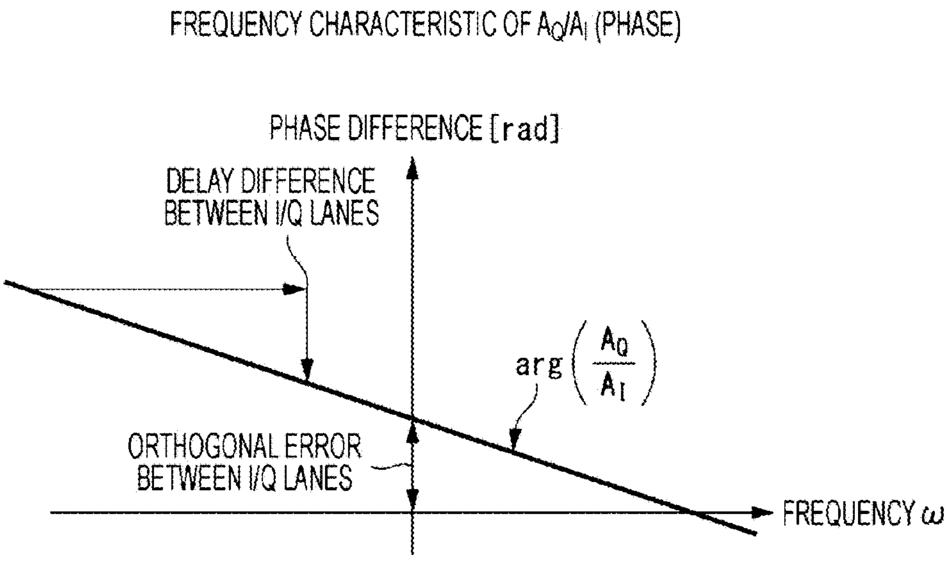
FIG. 7 is a diagram for illustrating how to obtain a delay difference and an orthogonal error between the I lane and the Q lane in the first embodiment.

FIG. 7 is a diagram for illustrating how to obtain a delay difference and an orthogonal error between the I lane and the Q lane in the first embodiment. As illustrated in FIG. 7, the estimation unit 236 calculates the ratio of the amounts of $A_I$ and $A_Q$ and calculates the phase difference based on arg ($A_Q/A_I$). The estimation unit 236 estimates a slope of the calculated frequency characteristic (phase) of ($A_Q/A_I$) as a delay difference between the I lane and the Q lane, and estimates an intercept of the frequency characteristic (phase) of ($A_Q/A_I$) as an orthogonal error between the I lane and the Q lane.

Figure 8:
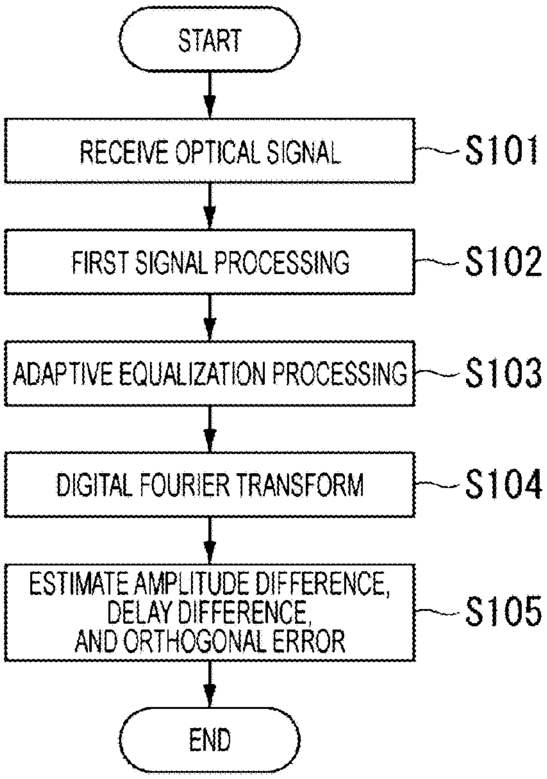
FIG. 8 is a flowchart illustrating a flow of processing of an optical reception device according to the first embodiment.

FIG. 8 is a flowchart illustrating a flow of processing of the optical reception device 20 according to the first embodiment.

The coherent optical reception unit 22 receives the optical signal transmitted from the optical transmission device 10 (Step S101). The optical signal received by the coherent optical reception unit 22 is converted into an electrical signal, then converted from an analog signal to a digital signal by an analog-to-digital converter, and input to the digital signal processing unit 23.

The first signal processing unit 231 performs first signal processing on the input digital signal (Step S102). The first signal processing unit 231 outputs the digital signal subjected to the first signal processing to the digital filter unit 232. The adaptive equalization unit 234 included in the digital filter unit 232 performs adaptive equalization processing on the digital signal subjected to the first signal processing output from the first signal processing unit 231 (Step S103).

The Fourier transform unit 235 performs digital Fourier transform on the tap coefficients set in the adaptive equalization unit 234 at the time of the adaptive equalization processing to convert the tap coefficients into a signal in a frequency domain (Step S104). The estimation unit 236 estimates the amplitude difference, the delay difference, and the orthogonal error based on the signal in a frequency domain by the Fourier transform unit 235 (Step S105). Specifically, as illustrated in FIGS. 6 and 7, the estimation unit 236 calculates the ratio of the amount of the signal $A_I$ in the frequency domain in the I lane and the amount of the signal $A_Q$ in the frequency domain in the Q lane, and obtains the amplitude ratio and the phase difference, thereby estimating the amplitude difference, the delay difference, and the orthogonal error.

According to the optical transmission system 100 configured as described above, it is possible to efficiently identify the cause of signal quality deterioration without performing measurement by a dedicated device. Specifically, the optical reception device 20 calculates the ratio of the linearly transformed amount after the tap coefficient of the digital filter is converted into the frequency domain signal by the digital Fourier transform, and estimates the physical quantity related to the response between the optical transmission device 10 and the optical reception device 20 from the amplitude and phase information. As a result, it is not necessary to perform measurement by a dedicated device, and there is no operational influence. Therefore, it is possible to efficiently identify a factor of signal quality deterioration without performing measurement by a dedicated device.

Furthermore, in the optical transmission system 100, by remotely monitoring a change with time of a physical quantity of an analog device included in each of the optical transmission device and the optical reception device in the optical transmission system, it is possible to reduce an operating expenditure (OPEX) such as rushing for failure.

Furthermore, by reflecting the physical quantity estimated by the optical reception device 20 in the analog device, it is possible to further improve signal quality that can be realized only by waveform equalization using a digital filter.

Second Embodiment

In a second embodiment, a case where a multi-carrier signal is input to an optical reception device will be described as an example. The configuration in the second embodiment is basically similar to that of the first embodiment, but the configuration of the digital filter is different. Furthermore, the processing in the digital filter unit 232 is different from that of the first embodiment. Hereinafter, differences from the first embodiment will be described.

Figure 9:
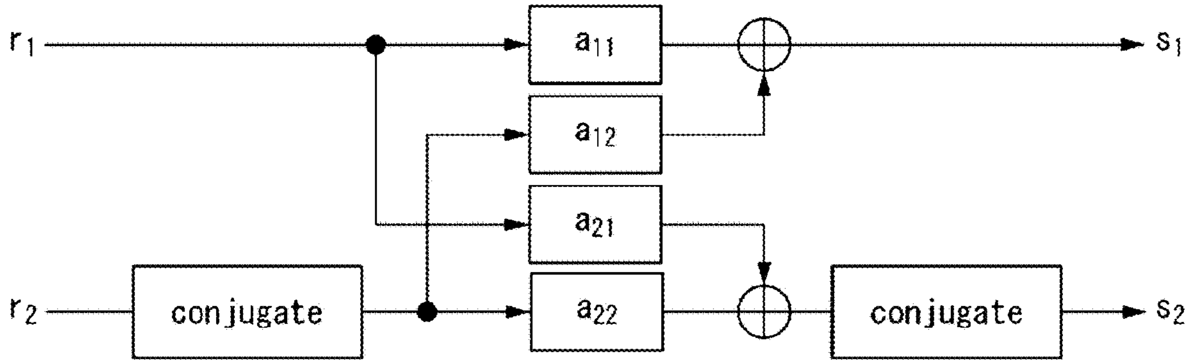
FIG. 9 is a diagram illustrating an example of a digital filter (FIR filter) included in a digital filter unit in a second embodiment.

FIG. 9 is a diagram illustrating an example of a digital filter (FIR filter) included in the digital filter unit 232 in a second embodiment. The digital filter illustrated in FIG. 9 is a digital filter that compensates for inter-subcarrier crosstalk (see, for example, Non Patent Literature 4). In FIG. 9, $a_{11}$ represents a tap coefficient $r_1 \rightarrow r_1$ component (complex number vector) of the digital filter, $a_{12}$ represents a tap coefficient $r_2 \rightarrow r_1$ component (complex number vector) of the digital filter, $a_{21}$ represents a tap coefficient $r_1 \rightarrow r_2$ component (complex number vector) of the digital filter, and $a_{22}$ represents a tap coefficient $r_2 \rightarrow r_2$ component (complex number vector) of the digital filter.

Here, the relationship between the input and output of the digital filter in FIG. 9 is expressed as (Equation 4) below.

[Math. 4]

$$\begin{pmatrix} S_1(\omega) \\ \tilde{S}_2(\omega) \end{pmatrix} = \begin{pmatrix} A_{11}(\omega) & A_{12}(\omega) \\ A_{21}(\omega) & A_{22}(\omega) \end{pmatrix} \begin{pmatrix} R_1(\omega) \\ \tilde{R}_2(\omega) \end{pmatrix} \quad \text{(Equation 4)}$$
$$\frac{G(\omega + \omega_c)}{H(\omega + \omega_c)} = \frac{A_{22}(\omega) + A_{12}(\omega)}{A_{22}(\omega) - A_{12}(\omega)}$$
$$\frac{G*(-\omega - \omega_c)}{H*(-\omega - \omega_c)} = \frac{A_{11}(\omega) + A_{21}(\omega)}{A_{11}(\omega) - A_{21}(\omega)}$$

The reference signs in (Equation 4) represent the following contents.

$A_{11}(\omega)$, $A_{12}(\omega)$, $A_{21}(\omega)$, $A_{22}(\omega)$: Values obtained by performing digital Fourier transform on the tap coefficients $a_{11}$, $a_{12}$, $a_{21}$, $a_{22}$ of the digital filter $\omega_c$: Carrier angular frequency of the subcarrier signal (real number)

H(ω), G(ω)): Values (complex numbers) after Fourier transform of h(k), g(k)

$S_1(\omega)$, ~$S_2(\omega)$ (~ is above $S_2$): Fourier transformed values of the two subcarrier signals arranged for a frequency of zero (complex number)

Here, relational expressions for deriving the relationship of (Equation 4) are illustrated in FIGS. 10 and 11. In FIGS. 10 and 11, $s_1(t)$ and $s_2(t)$ represent two subcarrier signals (complex numbers) arranged for a frequency of 0, h(k) and g(k) represent a time domain response (complex number) of an I/Q lane, and l(k) represents an ideal low-pass filter (complex number).

The Fourier transform unit 235 performs digital Fourier transform on the tap coefficients $a_{11}$, $a_{12}$, $a_{21}$, $a_{22}$ of the digital filter to convert the tap coefficients $a_{11}$, $a_{12}$, $a_{21}$, $a_{22}$ of the digital filter into signals in the frequency domain of $A_{11}(\omega)$, $A_{12}(\omega))$, $A_{21}(\omega)$, and $A_{22}(\omega)$. Thereafter, the estimation unit 236 calculates a ratio of amounts based on $A_{11}(\omega)$, $A_{12}(\omega))$, $A_{21}(\omega)$, and $A_{22}(\omega)$ converted into the signal in a frequency domain, and estimates physical quantities such as an amplitude difference, a delay difference, and an orthogonal error from amplitude and phase information of the calculated ratio.

Figure 12:
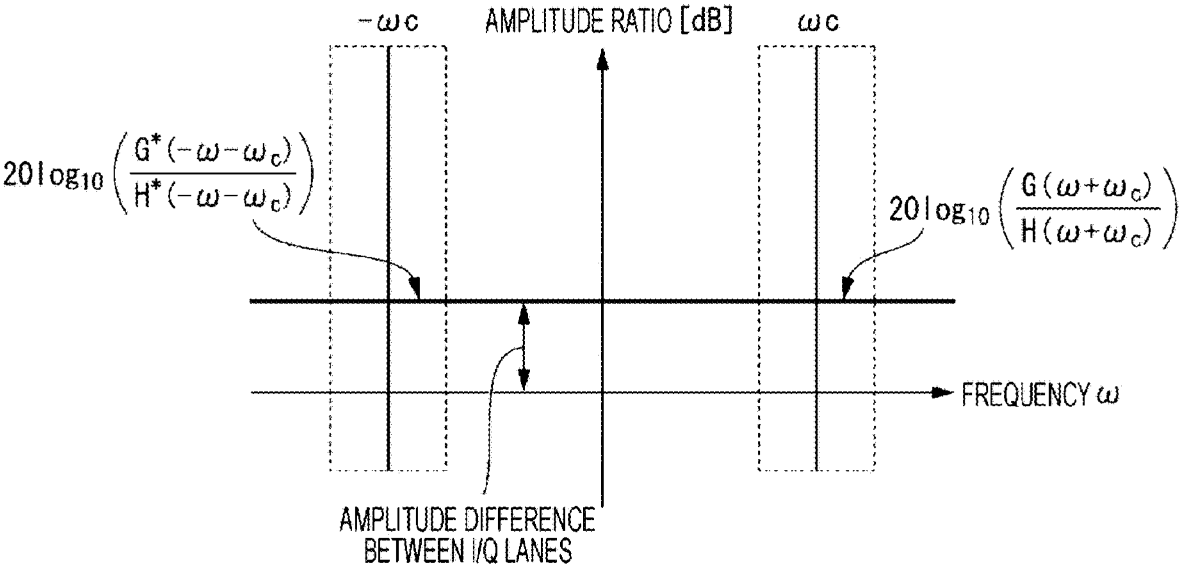
FIG. 12 is a diagram for illustrating how to obtain an amplitude difference between an I lane and a Q lane in the second embodiment.

FIG. 12 is a diagram for illustrating how to obtain an amplitude difference between the I lane and the Q lane in the second embodiment. The estimation unit 236 calculates an amplitude ratio based on $A_{11}(\omega)$, $A_{12}(\omega)$, $A_{21}(\omega)$, and $A_{22}(\omega)$ converted into the signal in a frequency domain based on (Equation 5) below. The estimation unit 236 estimates the calculated value of the amplitude ratio as the amplitude difference between the I lane and the Q lane.

[Math. 5]

$$20\log_{10}\left(\frac{G(\omega+\omega_c)}{H(\omega+\omega_c)}\right) \quad \text{(Equation 5)}$$

$$20\log_{10}\left(\frac{G*(-\omega-\omega_c)}{H*(-\omega-\omega_c)}\right)$$

Figure 13:
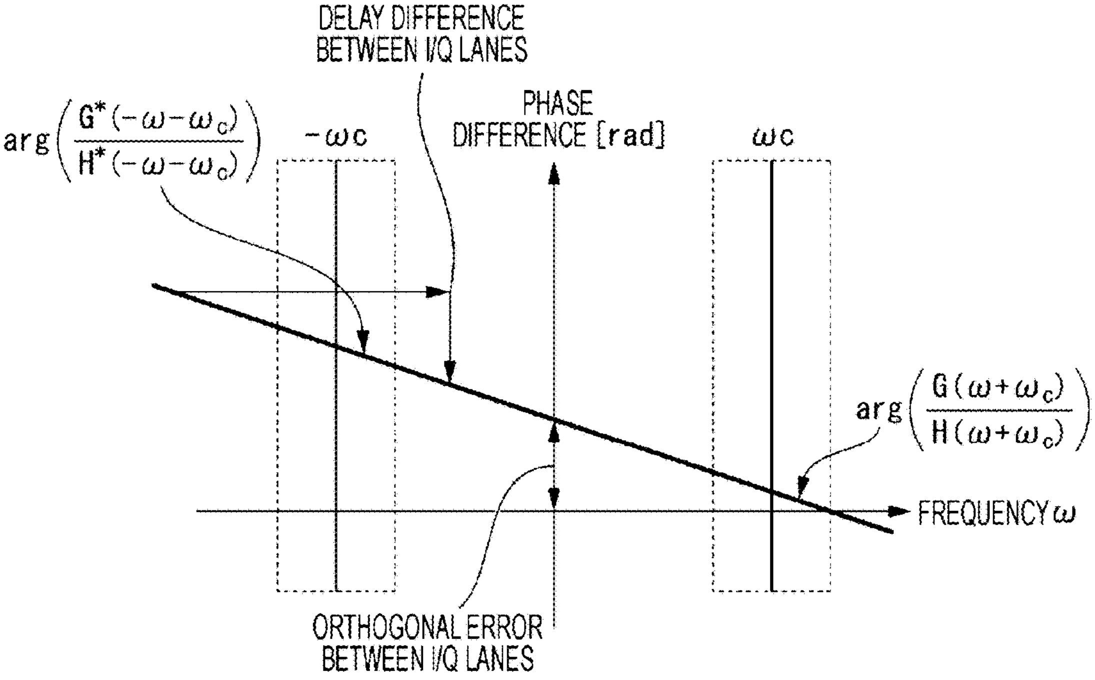
FIG. 13 is a diagram for illustrating how to obtain a delay difference and an orthogonal error between the I lane and the Q lane in the second embodiment.

FIG. 13 is a diagram for illustrating how to obtain a delay difference and an orthogonal error between the I lane and the Q lane in the second embodiment. As illustrated in FIG. 13, the estimation unit 236 calculates the phase difference based on $A_{11}(\omega)$, $A_{12}(\omega)$, $A_{21}(\omega)$, and $A_{22}(\omega)$ converted into the signal in a frequency domain based on (Equation 6) below. The estimation unit 236 estimates the slope of the frequency characteristic (phase) of the phase difference as a delay difference between the I lane and the Q lane, and estimates the intercept of the frequency characteristic (phase) of the phase difference as an orthogonal error between the I lane and the Q lane.

[Math. 6]

$$\arg\left(\frac{G(\omega+\omega_c)}{H(\omega+\omega_c)}\right) \quad \text{(Equation 6)}$$

$$\arg\left(\frac{G*(-\omega-\omega_c)}{H*(-\omega-\omega_c)}\right)$$

According to the optical transmission system 100 in the second embodiment configured as described above, even in a case where signals of a plurality of carriers are received by the optical reception device 20, it is possible to obtain an effect similar to that of the first embodiment.

Some functions of the optical reception device 20 in the above-described embodiments may be implemented by a computer. In that case, a program for implementing the functions may be recorded in a computer-readable recording medium, and the program recorded in the recording medium may be read and executed by a computer system to implement the functions. The "computer system" herein includes an operating system (OS) and hardware such as a peripheral device. In addition, the computer-readable recording medium refers to a portable medium such as a flexible disk, a magneto-optical disk, a read only memory (ROM), or a CD-ROM, or a storage device such as a hard disk included in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to an optical transmission system technology that performs equalization processing using a digital filter.

REFERENCE SIGNS LIST

10 Optical transmission device
11 Optical transmission unit
12 Electrical signal generation unit
13 Optical signal generation unit
20 Optical reception device
21 Optical reception unit
22 Coherent optical reception unit
23 Digital signal processing unit
30 Optical transmission path
31 Optical fiber
32 Optical amplifier
231 First signal processing unit
232 Digital filter unit
233 Second signal processing unit
234 Adaptive equalization unit
235 Fourier transform unit
236 Estimation unit

The invention claimed is:

1. An estimation method in an optical transmission system that performs communication by a digital coherent system including an optical transmission device and an optical reception device, the estimation method comprising:

obtaining complex tap coefficients of a digital filter by converting the tap coefficients of the digital filter included in the optical reception device into complex;

converting the complex tap coefficients of a digital filter into a frequency domain signal by digital Fourier transform;

calculating a ratio between signal in a frequency domain in an I lane and signal in a frequency domain in a Q lane, after conversion into a signal in a frequency domain; and estimating a physical quantity related to at least a response between the optical transmission device and the optical reception device based on amplitude and phase information of the ratio of the calculated ratio between signal in the frequency domain in the I lane and signal in the frequency domain in the Q lane.

2. The estimation method according to claim 1, wherein a delay difference between an I channel and a Q channel is estimated as a physical quantity related to a response between the optical transmission device and the optical reception device.

3. The estimation method according to claim 1, wherein an amplitude difference between an I channel and a Q channel is estimated as a physical quantity related to a response between the optical transmission device and the optical reception device.

4. The estimation method according to claim 1, wherein an orthogonal error between an I channel and a Q channel is estimated as a physical quantity related to a response between the optical transmission device and the optical reception device.

5. An optical reception device in an optical transmission system that performs communication by a digital coherent system including an optical transmission device and the optical reception device, the optical reception device comprising:

an adaptive equalizer configured to perform adaptive equalization processing using a digital filter;

a Fourier transformer configured to convert complex tap coefficients of the digital filter into a signal in a frequency domain by digital Fourier transform, the complex tap coefficients of the digital filter being obtained by converting the tap coefficients of the digital filter into complexed; and an estimator configured to calculate a ratio between signal in a frequency domain in an I lane and signal in a frequency domain in a Q lane, after conversion into a signal in a frequency domain by the Fourier transformer, and estimates a physical quantity related to at least a response between the optical transmission device and the optical reception device based on amplitude and phase information of the calculated ratio between signal in the frequency domain in the I lane and signal in the frequency domain in the Q lane.

6. A non-transitory storage medium that stores a program for making a computer perform processes as an optical reception device in an optical transmission system that performs communication by a digital coherent system including an optical transmission device and an optical reception device, the processes comprising:

obtaining complex tap coefficients of a digital filter by converting the tap coefficients of the digital filter included in the optical reception device into complex;

converting the complex tap coefficients of a digital filter into a signal in a frequency domain by digital Fourier transform, calculating a ratio between signal in a frequency domain in an I lane and signal in a frequency domain in a Q lane, after conversion into a signal in a frequency domain, and estimating a physical quantity related to at least a response between the optical transmission device and the optical reception device based on amplitude and phase information of the calculated ratio between signal in the frequency domain in the I lane and signal in the frequency domain in the Q lane.

* * * * *